US006611746B1

(12) United States Patent
Nagai

(10) Patent No.: US 6,611,746 B1
(45) Date of Patent: Aug. 26, 2003

(54) INDUSTRIAL VEHICLE WITH A DEVICE FOR MEASURING LOAD WEIGHT MOMENT AND A METHOD THEREFOR

(75) Inventor: Katsumi Nagai, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/804,096

(22) Filed: Mar. 12, 2001

(30) Foreign Application Priority Data

Mar. 22, 2000 (JP) ....................................... 2000-079650

(51) Int. Cl.[7] .............................. G06F 19/00; B66F 9/06

(52) U.S. Cl. .......................................... 701/50; 187/222

(58) Field of Search .................... 701/50; 187/222–226, 187/228–230, 237–238, 250, 351, 285–287, 390–394, 397–399, 401, 411, 404–405; 414/373, 377, 379, 381–386, 389–392, 394, 339–343, 345–348, 444, 467–469, 487; 37/411–414

(56) References Cited

U.S. PATENT DOCUMENTS

| | | | | | |
|---|---|---|---|---|---|
| 4,509,127 | A | | 4/1985 | Yuki et al. | 364/478 |
| 4,511,974 | A | | 4/1985 | Nakane et al. | 364/463 |
| 4,828,066 | A | * | 5/1989 | Hayashi | 180/446 |
| 4,942,529 | A | * | 7/1990 | Avitan et al. | 701/50 |
| 5,749,696 | A | * | 5/1998 | Johnson | 414/635 |
| 5,941,921 | A | * | 8/1999 | Dasys et al. | 701/50 |
| 5,984,322 | A | * | 11/1999 | Lee | 280/6.159 |
| 6,082,742 | A | * | 7/2000 | Ishikawa | 280/5.508 |

FOREIGN PATENT DOCUMENTS

| | | | | |
|---|---|---|---|---|
| EP | 0 884 202 A2 | | 12/1998 | |
| EP | 0 916 526 A2 | | 5/1999 | |
| EP | 0 924 160 A2 | | 6/1999 | |
| JP | 07-242398 | * | 9/1995 | B66F/9/24 |
| JP | 2000-64360 | | 2/2000 | E02F/9/20 |

* cited by examiner

*Primary Examiner*—Thu Nguyen
(74) *Attorney, Agent, or Firm*—Morgan & Finnegan, LLP

(57) ABSTRACT

An industrial vehicle has a loading attachment, a mast, a tilt cylinder, first and second pressure sensors and a controller. The mast supports the attachment and guides the attachment. The tilt cylinder has a piston and a piston rod and operates by hydraulic fluid from a hydraulic fluid source. The piston rod connects with the piston and also connects with the mast. The piston divides the inside of the tilt cylinder into a rod side chamber and a bottom side chamber. The first and second pressure sensors respectively detect pressures of the hydraulic fluid in the rod side and the bottom side chambers. The controller calculates an axial force applied to the tilt cylinder based on signals detected by the sensors and calculates load weight moment in a back and forth direction of the vehicle based on the axial force and compares the calculated moment with a predetermined value.

13 Claims, 7 Drawing Sheets

INDUSTRIAL VEHICLE WITH A DEVICE FOR MEASURING LOAD WEIGHT MOMENT AND A METHOD THEREFOR

BACKGROUND OF THE INVENTION

The present invention relates to an industrial vehicle having a tiltable mast which supports a loading attachment and guides a movement of the attachment, more particularly to a device for measuring a load weight moment in back-and-forth direction of such an industrial vehicle.

A forklift truck as an industrial vehicle has a pair of masts each including outer and inner masts so that the masts can extend upward. The masts, which are mounted on the front portion of the truck body, support a fork by means of a lift bracket slidably provided between the masts. A lift cylinder provided on the truck raises and lowers the lift bracket together with the fork along the masts, up to the top of the fully extended masts. The forklift truck further includes tilt cylinders. The tilt cylinders tilt the masts forward and backward with respect to vertical positions of the masts. The tilting action of the masts makes the loading work easy and stabilizes the forklift truck.

However, when the fork is loaded, a gravity center of the forklift truck moves forward. And a moment of the load acting on the masts becomes large when the fork is raised higher by the extended masts. If the mast with the fork loaded is tilted forth, the center of gravity moves forth further, causing the stability in the longitudinal direction (back-and-forth direction) of the forklift truck to be worsened. On the other hand, if the mast with a loaded fork is tilted backward together with the center of gravity, front wheels of the truck may tend to be raised and to possibly slip. Therefore, in a conventional forklift truck, a tiltable angle range of the mast in both back and forth directions of the truck are fixed at certain values.

In case that the load is placed at a higher location, the mast has to be tilted forth while the fork is raised higher. At this time, if the mast is mistakenly tilted forth at high speed, the load may be crumbled or rear wheels of the truck may float. That is, the forklift truck is in unstable condition, especially, in its longitudinal direction. Therefore, operators of the truck has to carefully incline the masts at low speed by inching operation to avoid too much forward inclination of the mast, whereby the operators are stressed mentally very much.

To resolve the above problems, there is a forklift truck which stops forward tilting motion of the masts, or whose alarm means goes off when a load eight moment detected through the tilt cylinder approaches unstable condition of the forklift truck. In a conventional art as shown in FIG. 7, a method for measuring moment in a longitudinal direction of the forklift truck is known, as follows.

A pressure sensor 54 is provided to sense pressure of hydraulic fluid in a rod side chamber of a tilt cylinder 53 which tilts a mast 52 of the forklift truck 51. Based on the detected pressure by the sensor 54, load weight moment M is calculated by the following equation.

$$M=2FL$$

In the equation, the numeral "2" means to double thrust or axial force of the tilt cylinder 53 because the forklift truck has two tilt cylinders mounted on both left and right sides of the truck. The letter "F" represents the axial force of the tilt cylinder calculated by multiplying the tilt pressure and pressured area of the tilt cylinder 53. The letter "L" represents the distance between a rotational center of front wheels 58 and the longitudinal axis of the tilt cylinder 53.

The pressure sensor 54 is disposed on a conduit 57 connecting a control valve 56, which controls supply of the hydraulic fluid to the tilt cylinder 53 based on operation of a tilt lever 55, to the rod side chamber of the tilt cylinder 53. The pressure sensor 54 is arranged on either one of the conduits 57 each connected to their respective tilt cylinders 53 because an equal pressure acts on each of the tilt cylinders 53 mounted on both the left and right sides of the forklift truck.

However, it is difficult for the conventional forklift truck to continuously detect the accurate pressure corresponding to the load weight W because the pressure detected by the sensor 54 dose not always accurately reflect the load weight W on the fork 59 of the forklift truck 51.

For example, when the control valve 56 is switched to its neutral position from its forward tilting position by manipulation of the control valve 56 at the time the mast 52 is tilting forth, extra pressure corresponding to acceleration of the tilting mast 52 may be involved within the conduit 57. As a result, the pressure sensor 54 detects the pressure more than exact pressure corresponding to the load weight W. On the other hand, when the control valve 56 is switched from the neutral position to the forward tilting position, the hydraulic fluid acts on the bottom side room of the tilt cylinder. As a result, the pressure sensor 54 detects the pressure more than exact pressure corresponding to the load weight W because the pressure acting on the bottom room is added to the pressure corresponding to the load weight W.

Moreover, when the mast 52 reaches its maximum forward tilting position which means a stroke end of the tilt cylinder, no pressure acts on the rod side chamber of the cylinder. As a result, the pressure sensor 54 does not detect any pressure corresponding to the load weight W. When the mast 52 reaches its maximum backward tilting position, another stroke end of the tilt cylinder, the maximum pressure set by a relief valve acts on the rod side chamber. As a result, extra pressure larger than exact pressure corresponding to the load weight W is detected by the pressure sensor 54.

SUMMARY OF THE INVENTION

It is an object of the present invention to provide a device for measuring a load weight moment in back-and-forth direction of an industrial vehicle without affection of a control valve manipulation controlling fluid flow to a tilt cylinder which tilts a mast of the vehicle.

It is another object of the present invention to provide a device for continuously measuring a moment in back-and-forth direction of an industrial vehicle without detecting pressure in a tilt cylinder when a control valve controlling fluid flow to the tilt cylinder is switched from its neutral position to its forward or backward tilting position such that the tilt cylinder reaches its forward or backward stroke end.

To attain the above first object, an industrial vehicle according to the present invention comprises first and second pressure sensors which detect pressures in both a rod side chamber and a bottom side chamber of a tilt cylinder. Detected signals from the both sensors are used for calculating thrust or axial force of the tilt cylinder. A load weight moment in back-and-forth direction of the vehicle is calculated based on the thrust force calculated from the pressures in both the rod and bottom side chambers.

According to the present invention, the thrust of the tilt cylinder is calculated by the following equation.

$$F=P_1S_1-P_2S_2$$

Letters "$P_1$" and "$P_2$" each denote pressures in the rod side chamber and the bottom side chamber of the tilt cylinder, respectively. Letters "$S_1$" and "$S_2$" denote areas receiving the pressures in the rod side chamber and the bottom side chamber of the cylinder, respectively. A letter "F" denotes the thrust force. According to the formula, it is clear that affection of the pressure $P_2$ in the bottom side chamber exerting upon the pressure $P_1$ in the rod side chamber is offset or cancelled. As a result, the thrust force F corresponding to the load weight W is accurately calculated. The load weight moment in the back-and-forth direction of the vehicle is then calculated by multiplying the thrust force F and the distance L between a center of a front wheel and a longitudinal axis of the tilt cylinder.

Preferably, the first pressure sensor is arranged in the first conduit connected to the rod side chamber, and the second pressure sensor is arranged in the second conduit connected to the bottom side chamber of the cylinder. The calculation may be corrected by correcting means which compensates pressure losses within the first and second conduit. Therefore, the correcting means compensates the pressure losses in the first conduit and in the second conduit, then, the pressure in the rod side chamber and in the bottom side chamber of the cylinder are detected accurately, even though the pressure loss of the hydraulic fluid flowing in the first or second conduit becomes an error.

Correction values used for the correcting means may be represented by a function of the tilt cylinder in its operating condition. The correction value can be changed by the function of the tilt cylinder in active condition according to the tilting speed of the mast and the direction of the tilting motion, the pressure loss, which occurs in the first conduit to the rod side chamber of the cylinder or in the second conduit to the bottom side chamber of the cylinder, is easily corrected, even though the direction and the speed of the hydraulic oil flowing in the first or second conduit changes.

The present invention is further equipped with a stroke end sensor which detects the stroke end of the tilt cylinder, a weight sensor which detects the load weight on the loading attachment and a height sensor which detects the lifting height of the loading attachment. At the stroke end position of the cylinder, it is determined whether the lifting height is within a certain predetermined range or not, based on the load weight and the lifting height, instead of the pressure.

According to the present invention, even though the load weight moment cannot be measured by the pressure acting on the tilt cylinder when the tilt cylinder is positioned at the stroke end, it can be determined whether a vehicle is stable or not because loading condition of the attachment can be found from the tilting angle of the tilt cylinder, the load weight and the load height by detecting the stroke end of the cylinder and the lifting height.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
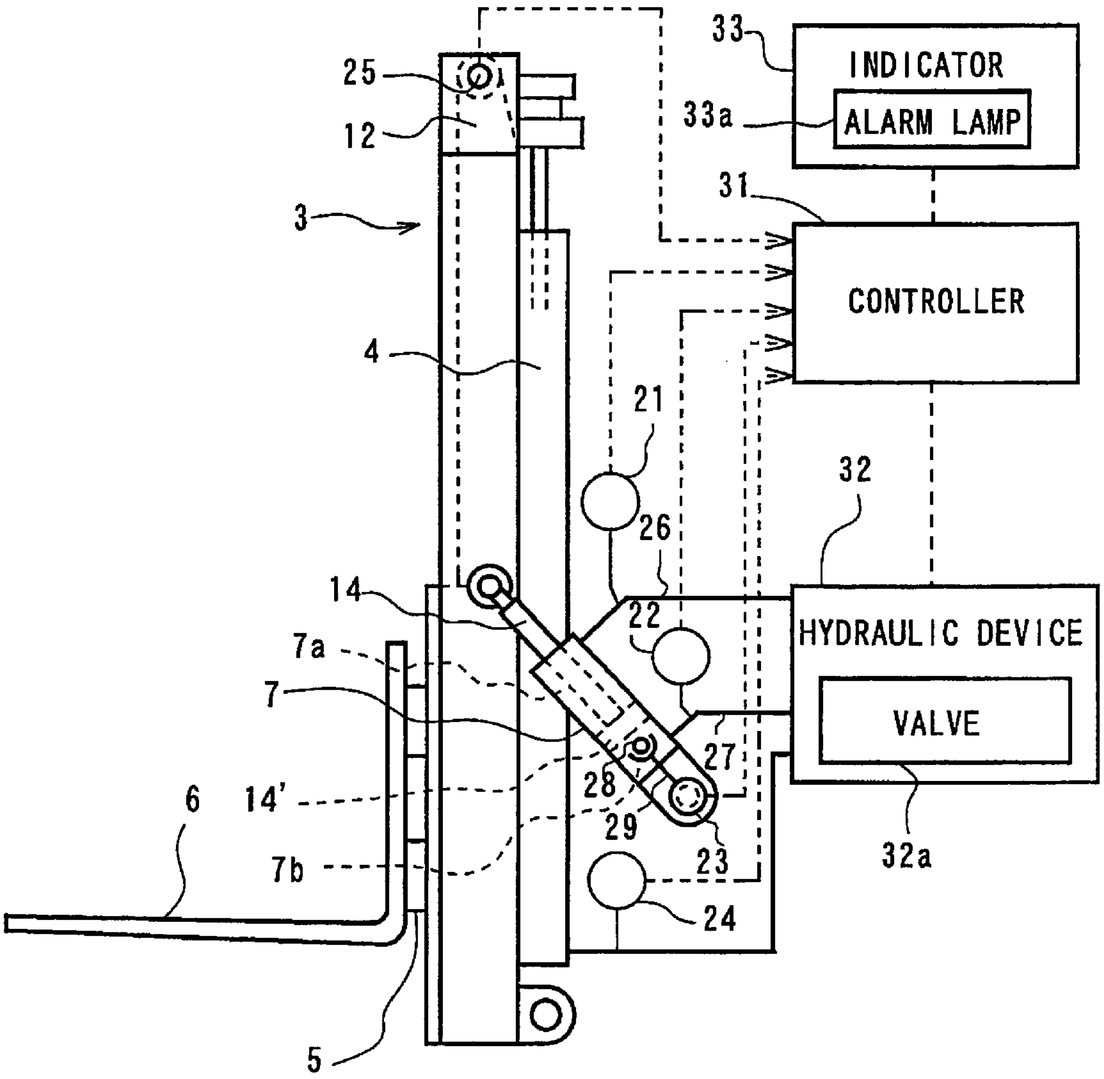
FIG. 1 is an exemplary diagram illustrating a measuring device for measuring load weight moment according to the present invention.

An embodiment of the present invention applied to a forklift truck as an industrial vehicle is described in FIGS. 1 to 6. First, a forklift truck as an industrial vehicle is described exemplarily in FIG. 2.

A forklift truck 1 has a pair of masts 3 mounted on a front portion of a body frame 2 of the forklift truck 1. Each of the masts 3 comprises an outer mast 11 and an inner mast 12. The outer and inner masts 11, 12 together are tiltable with respect to the body frame 2. Mounted parallel to the mast 3 is a lift cylinder 4 whose base end is connected to a lower portion of the outer mast 11. A top end of a piston rod 13 of the lift cylinder 4 is connected to an upper portion of the inner mast 12. A lift bracket 5 to which a fork as a loading attachment is attached is installed between the inner masts 12, the bracket 5 being slidable along the inner mast 12.

Tilt cylinders 7 having their respective piston rod 14 and piston 14' are rotatably supported on their respective right and left sides of the body frame 2 by means of connecting pins 15. A top end of each the piston rod 14 is rotatably connected to the outer mast 11 by means of connecting pins 16. The mast 3 is tiltable forth and back from its vertically standing position by the tilt cylinders 7. The piston 14' divides inside of the tilt cylinder 7 into a rod side chamber 7*a* and a bottom side chamber 7*b*.

Figure 2:
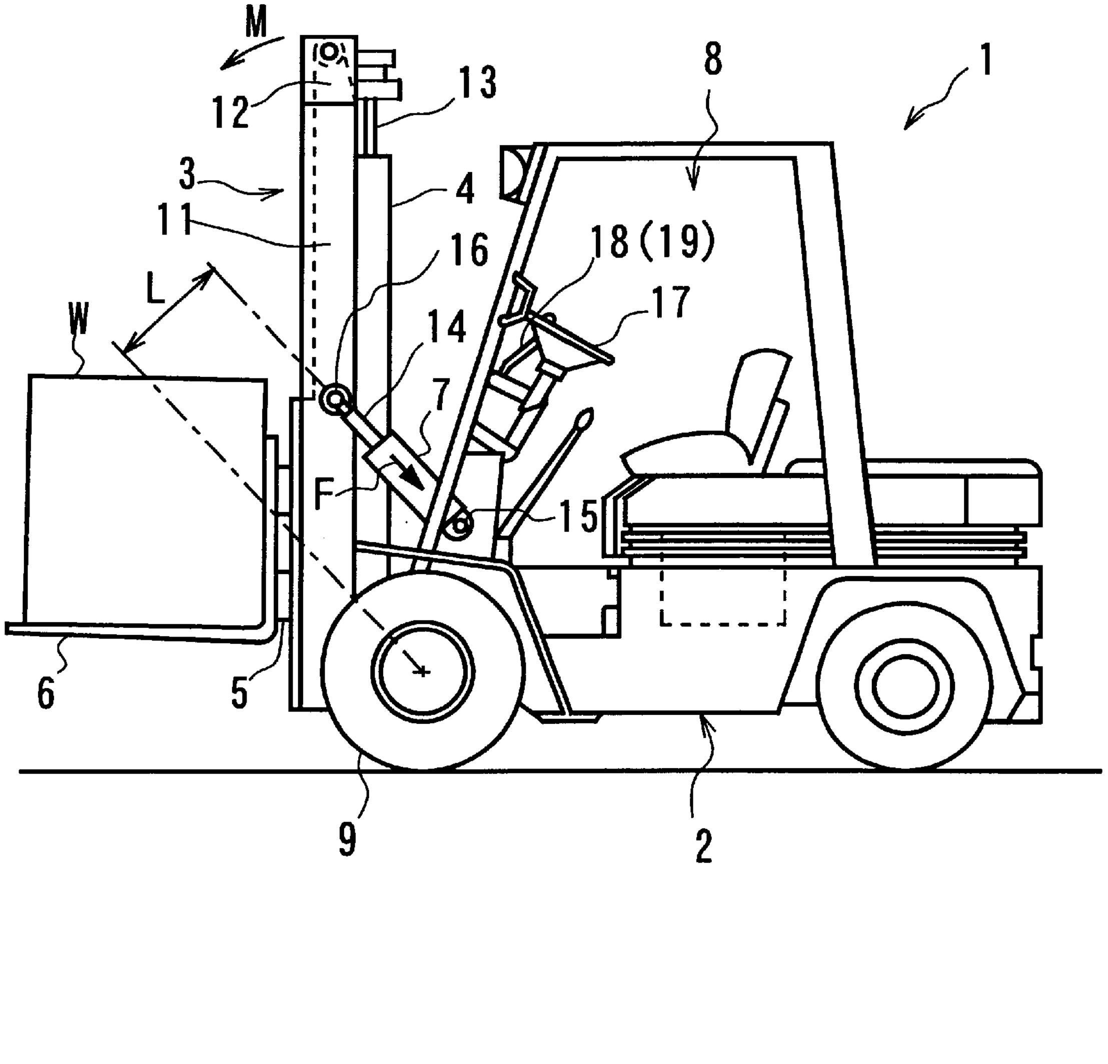
FIG. 2 is an exemplary side view illustrating a forklift truck to which a load weight moment measuring device is applied according to the present invention.

The forklift truck 1 has a cabin 8 in which a steering wheel 17, a lift lever 18 and a tilt lever 19 are arranged. In FIG. 2, both the levers 18 and 19 are illustrated at overlapped condition.

The lift cylinder 4 is operated by operation of the lift lever 18, and the tilt cylinders 7 are operated by operation of the tilt lever 19. Based on lift-up operation of the lift lever 18, the lift cylinder 4 projects the piston rod 13 and to lift up the inner masts 12, whereby the fork 6 is raised. Based on tilt-forward operation of the tilt lever 19, the tilt cylinders 7 project their respective piston rods 14 and to tilt the masts 3 forth. Accompanying the tilt-forward motion of the masts 3, the tilt cylinders 7 are rotated downward around the pins 15. On the contrary, tilt cylinders 7 retract their respective piston rods 14 through the tilt lever operation and move the masts 3 backward. Accompanying the tilting back motion of the masts 3, the tilt cylinders 7 are rotated upwards around the pins 15.

When the mast 3 is tilted forth from its vertically standing position in such a condition that a load W is being carried on the fork 6 during the fork 6 being raised, a load weight moment M based on the load W around the rotational axis of the front wheels 9 acts on the body, and axial force or thrust F corresponding to the load weight moment M acts on the tilt cylinders 7.

As shown in FIG. 1, a measuring device for measuring load weight moment in back-and-forth direction applied to such a forklift truck comprises a first pressure sensor 21 which detects pressure in the rod side chamber 7*a* of the tilt cylinder 7, a second pressure sensor 22 which detects pressure in the bottom side chamber 7*b* of the tilt cylinder 7, and a controller 31 which contains calculating means for calculating thrust of the tilt cylinder 7 from the detected pressures in the rod side chamber 7*a* and the bottom side chamber 7*b* and correcting means as a program.

The measuring device further comprises a first potentiometer 23 as a stroke sensor for detecting both a tilting angle of the mast 3 and a stroke end of the tilt cylinder 7, a third pressure sensor 24 as a load weight sensor for detecting load weight on the fork 6, a second potentiometer 25 as a lifting height sensor for detecting height of the fork 6. The controller 31 may calculate a value corresponding to load weight moment M based on the detected load weight and height of the fork 6 when the tilt cylinder 7 reaches its stroke end.

A hydraulic device 32 and an indicator 33 are connected to the controller 31. The hydraulic device 32, which accommodates an electromagnetic valve 32*a* as a changeover valve to control supply of hydraulic fluid to the tilt cylinders 7 and the lift cylinder 4, drives the cylinders 7 and 4.

Switching the valve 32*a* is controlled by the controller 31. The indicator 33 is placed at the position where it is easily seen by an operator, e.g., on an instrument panel in the cabin 8. In the indicator 33, an alarm lamp 33*a* is provided to be ON by the controller 31 when necessary.

The first pressure sensor 21 is arranged at a first conduit 26 connected to the rod side chamber 7*a* of the tilt cylinder 7. The pressure sensor 21 outputs a signal which corresponds to detected pressure of the hydraulic fluid flowing to the rod side chamber 7*a* of the tilt cylinder 7.

The second pressure sensor 22 is arranged at a second conduit 27 to the bottom side chamber 7*b* of the tilt cylinder 7. The pressure sensor 22 outputs a signal which corresponds to detected pressure of the hydraulic fluid flowing to the bottom side chamber 7*b* of the tilt cylinder 7.

The potentiometer 23 is arranged at the position of the connecting pin 15. As shown in FIG. 1, the tilt cylinder 7 further has a pin 28 on the outer surface of cylinder 7 and a lever 29 which has connecting portions at its both end. The connecting portions of the lever 29 are capable of rotating around the corresponding pins 15, 28. Accompanying with projection and retraction of the piston rod 14, the lever 29 turns around the pin 15, and then, the potentiometer 23 detects the rotation angle of the connecting portion of the lever 29 around the pin 15, and outputs a signal (electrical voltage) corresponding to the angle.

The pressure sensor 24 for detecting a load weight on a fork 6 is arranged at the lift cylinder 4. The pressure sensor 24 outputs a signal corresponding to pressure of the hydraulic fluid in the bottom chamber of the lift cylinder 4.

A potentiometer 25 as the height sensor is arranged to detect rotation angle of a reel around which a wire connected to the fork 6 or the lift bracket 5 is wound. The reel is disposed at the top of the inner mast 12. The potentiometer 25 continuously outputs a signal of a rotation angle of the reel which corresponds to lifting height of the fork 6.

The signals from the pressure sensors 21, 22 and 24 and the potentiometers 23 and 25 are all transmitted to the controller 31.

Figure 3:
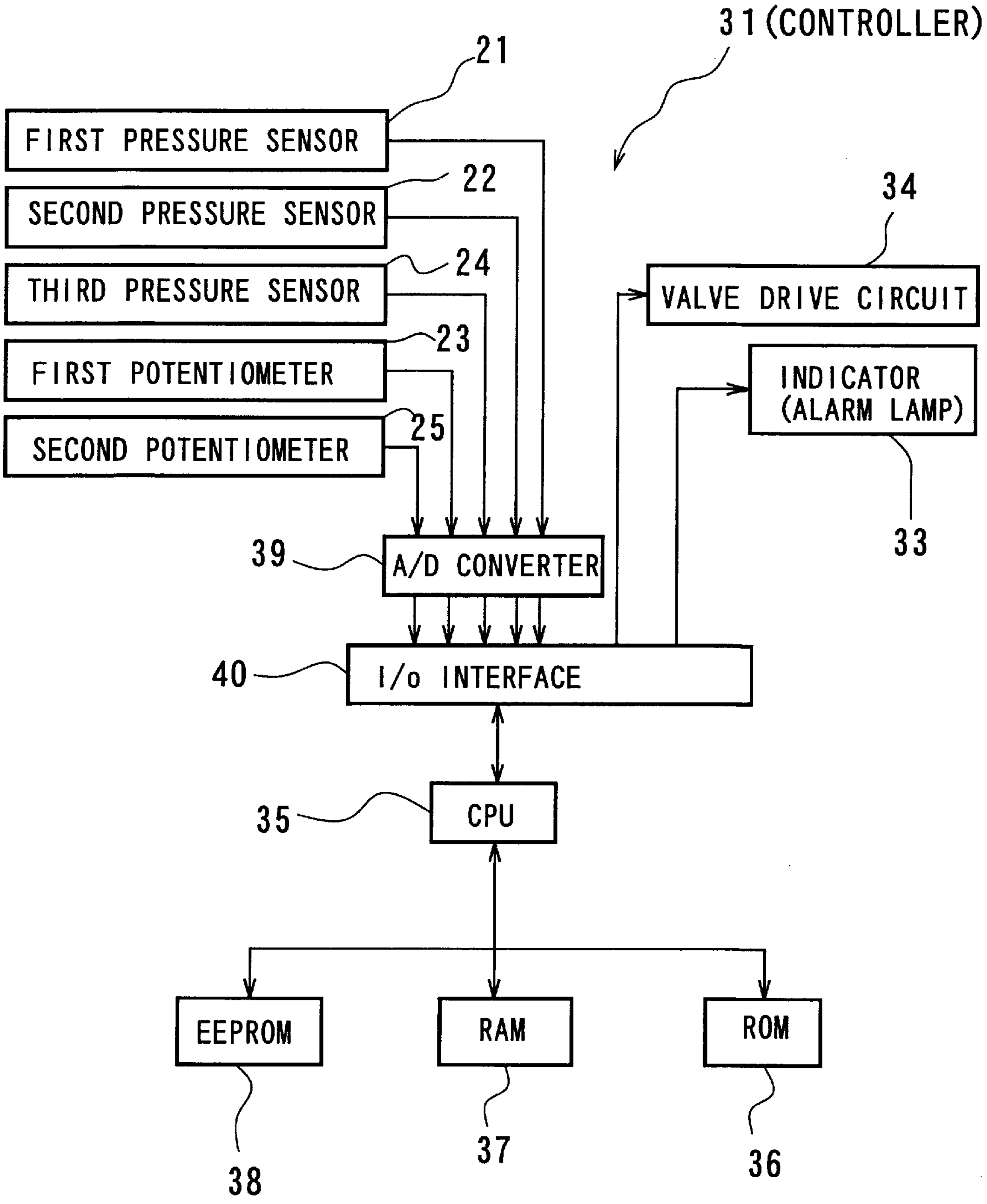
FIG. 3 is a schematic block diagram of a load weight moment measuring device according to the present invention.

Referring to FIG. 3 showing electrical block diagram, the controller 31 includes a Central Processing Unit (CPU) 35 as the calculating means, a Read Only Memory (ROM) 36, a Random Access Memory (RAM) and an Electrically Erasable and Programmable Read Only Memory (EEPROM) 38.

The ROM 36 and the EEPROM 38 contain data necessary to perform various control programs. The data in the EEPROM 38 is capable of being changed. The CPU 35 is connected with the pressure sensors 21, 22, 24 and the potentiometers 23, 25 through an A/D converter 39 and an I/O interface 40. The CPU 35 is further connected to the valve drive circuit 34 and the indicator 33 including the alarm lamp through the interface 40.

Figure 4:
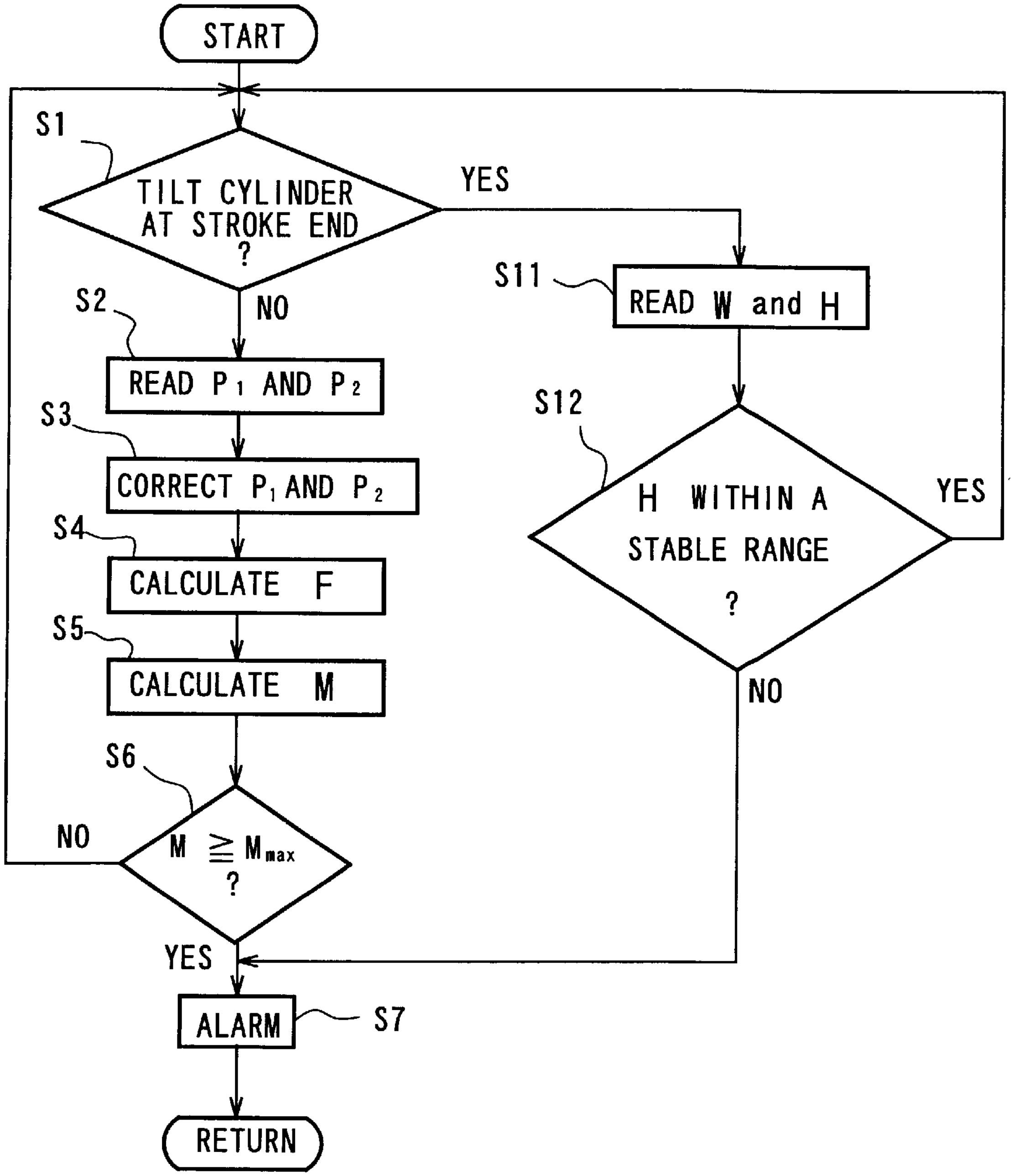
FIG. 4 is an exemplary flow chart illustrating a load weight moment measuring device according to the present invention.

Referring now to a flow chart shown in FIG. 4, programmed performance after drives turning on a key switch, thereby turning on the controller 31 and starting the program.

At step S1 the controller 31 judges whether the tilt cylinder 7 is at stroke end or not, based on an output from the potentiometer 23. In this embodiment, when the piston rod 14 of the tilt cylinder 7 projects to reach its front stroke end, an output, an electrical voltage, from the potentiometer 23 is set as minimum. When the piston rod 14 of the tilt cylinder 7 is retracted to its rear stroke end, an output from the potentiometer 23 is set as maximum. Accordingly, both the stroke ends are detected by minimum and maximum electrical voltages. The controller 31 also judges the direction of the tilting motion based on the voltage from the potentiometer 23. If the piston rod 14 of the tilt cylinder 7 is not at the stroke end, the controller 31 at step S2 reads pressures $P_1$ and $P_2$ in the rod side chamber 7*a* and the bottom side chamber 7*b* based on outputs from the pressure sensors 21 and 22.

Since the pressure sensors 21 and 22 are arranged at the first conduit 26 and the second conduit 27, respectively, pressure losses in the conduits 26, 27 are corrected at step S3. That is, when the mast is in its tilting forth motion, the correction is done such that $P_1+\alpha$ is treated as new $P_1$ for measured pressure in the rod side chamber 7*a*. On the contrary, $P_2-\alpha$ is treated as new $P_2$ for measured pressure in the bottom side chamber 7*b*. Likewise, when the mast is in tilting back motion, $P_1-\alpha$ is treated as new $P_1$ for the rod side and $P_2+\alpha$ as new $P_2$ for the bottom side.

When tilting motion of the mast 3 stops, there is no pressure loss in the conduits 26 and 27. Therefore, it is unnecessary to correct the pressures $P_1$ and $P_2$. The correction value a is preferably a function of tilting speed of the mast 3. The speed is detected based on outputs from the potentiometer 23 such as the displacement quantity or angular speed of the potentiometer 23. The controller judges whether the mast 3 is in tilting forth or back based on an output from the potentiometer 23.

At step S4 the thrust F is calculated by the equation (1).

$$F=P_1S_1-P_2S_2 \tag{1}$$

$S_1$ denotes a pressured area in the rod side chamber 7*a*, and $S_2$ denotes a pressured area in the bottom side chamber 7*b*. Here, $P_1$ and $P_2$ are the corrected pressures as mentioned.

At step S5 the same axial force acts on the tilt cylinders 7 which are equipped at both sides, left and right of the forklift. A load moment M in back and forth direction is calculated by the equation (2).

$$M=2FL \tag{2}$$

L denotes the distance between the rotational axis of the wheel 9 and the longitudinal axis of the tilt cylinder 7. This distance L, which depends on tilt angles of the mast 3, is calculated from a function with respect to relation between tilt angles of the mast 3 and outputs of the potentiometer 23.

At step S6 the controller 31 judges whether the load weight moment M has reached a certain value $M_{max}$ which makes the forklift truck 1 unstable. When the load weight moment M reaches $M_{max}$ or more, the indicator 33 alarms by turning on the lamp 33*a* at step S7. Alarm sound may simultaneously go off. The judgment at step S6 of the moment M less than $M_{max}$ returns the flow to step S1 and repeats the flow.

At step S1, if the piston rod 14 of the tilt cylinder 7 positions at the stroke end, the thrust cannot be calculated by the pressures $P_1$ and $P_2$. At this time the value equivalent to the load weight moment M should be calculated. Therefore, the equivalent value is measured at steps S11 and S12 without pressures $P_1$ and $P_2$.

Figure 6:
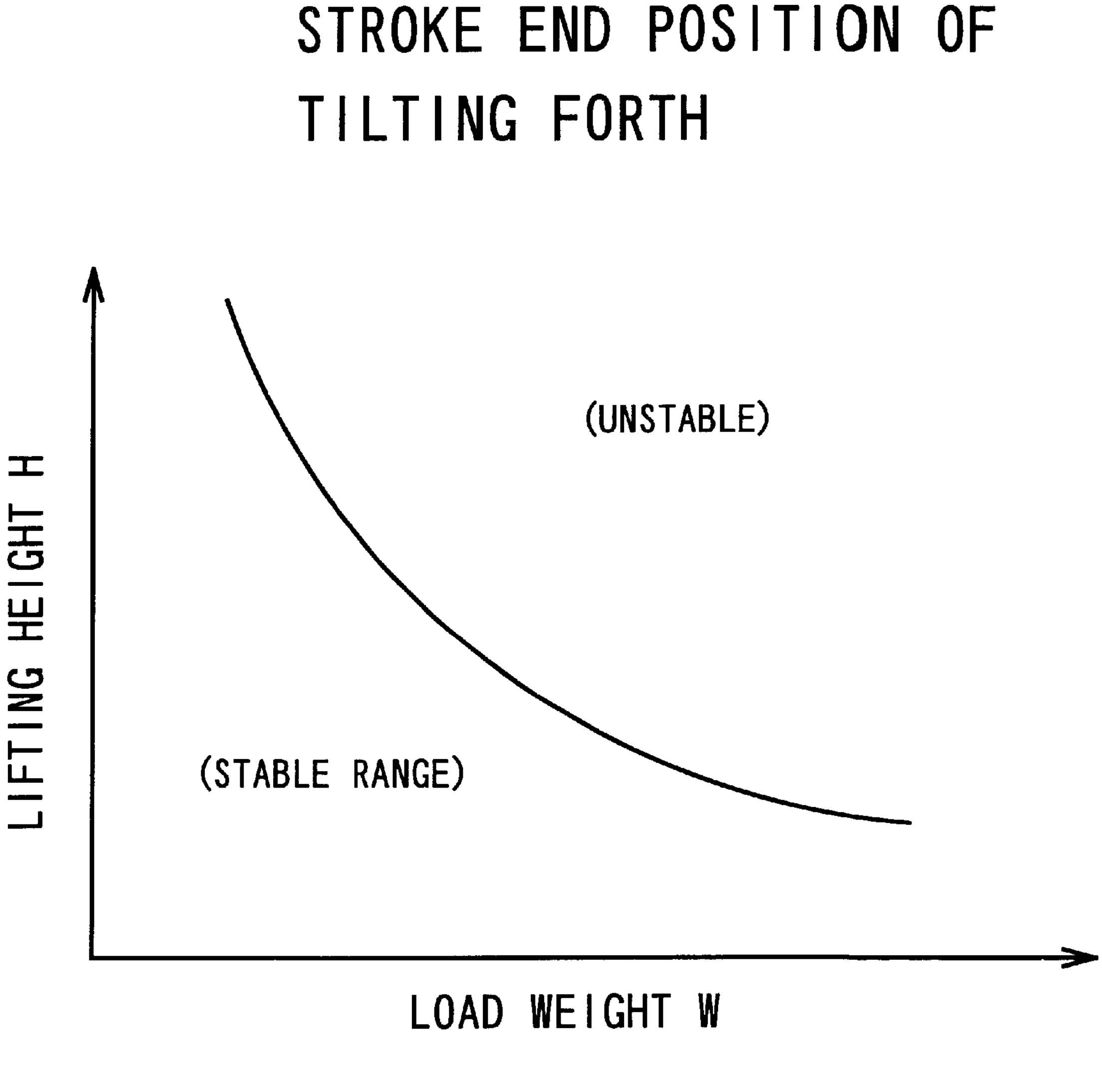
FIG. 6 is a graph illustrating a connection between lifting height and load weight corresponding to certain load weight moment at stroke end position of a tilt cylinder where a mast is tilted forth according to the present invention.
Figure 7:
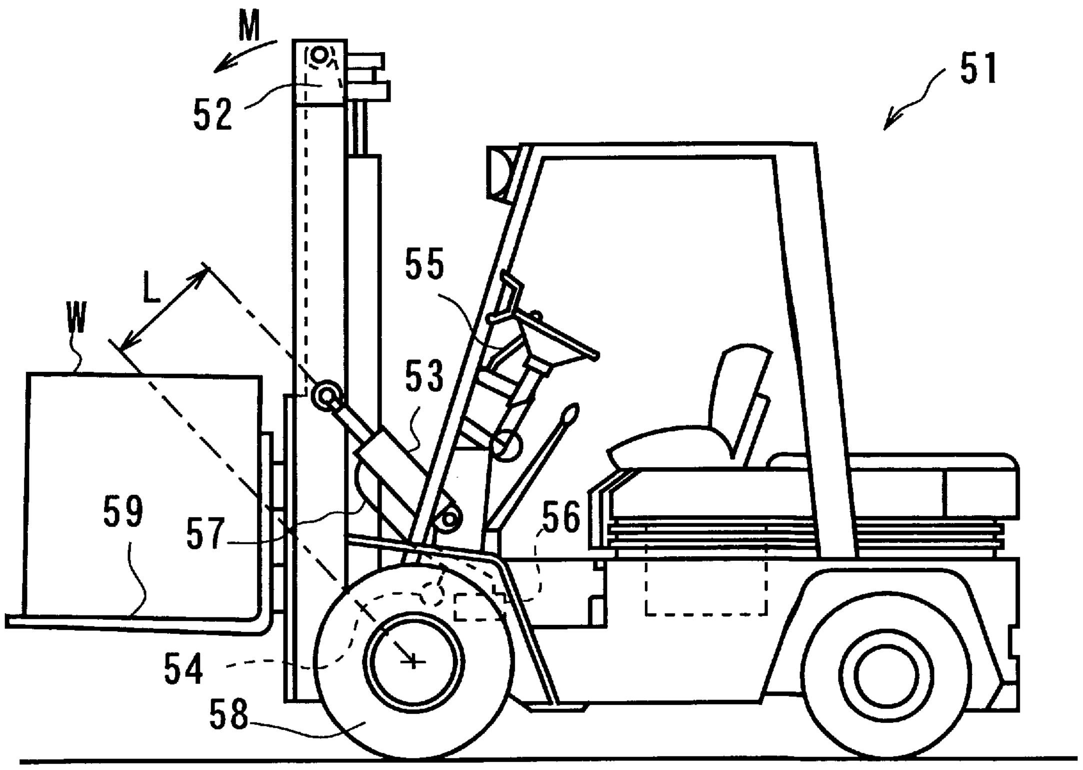
FIG. 7 (PRIOR ART)
FIG. 7 is an exemplary side view illustrating a forklift truck having a conventional load weight moment measuring device.

After the controller 31 reads weight W and height H of the fork 6 based on outputs from the third pressure sensor 24 and the second potentiometer 25 at step S11, the controller follows step 12 to judge whether the height H of the fork 6 is within a stable range in relation with the weight W of the fork 6. That is, the controller has a relationship or a function between weight and height to compare the detected weight W and height H of the fork 6. As shown in FIG. 6, a range under the function shown in FIG. 6 is the stable range for the forklift truck 1. If the detected height H reaches or exceeds a value of the function at the detected weight W, the controller 31 judges that the forklift truck 1 is unstable, and transmits a signal to the indicator 33 to alarm. The judgment that the height H is within the stable range returns this process to step 1 and repeats the process.

Using the following equations, the stable condition of the forklift truck is found by the function shown in FIG. 6 as mentioned above.

$$H_e=f(W) \tag{3}$$

$$M_e=H-H_c \tag{4}$$

$H_c$ denotes a calculated height of the fork 6 based on the function shown in FIG. 6. $M_e$ denotes a difference between the detected height H and the calculated height $H_c$, the value equivalent to the load weight moment based on pressures $P_1$ and $P_2$. Therefore, calculating the equivalent value $M_e$, the controller 31 judges whether the detected height H of the fork 6 is within the stable range for the forklift truck 1.

The above embodiment has the following advantages.

I. As thrust F of the tilt cylinder 7 is calculated by the equation (1), affection that pressures in the rod side and bottom side chambers 7*a*, 7*b* exerts on each other is eliminated or cancelled, particularly, when direction of the tilt cylinder 7 is switched. Accordingly, the thrust F is correctly calculated, thereby the load weight moment M in back-and-forth direction is also accurately measured. As a result, the forklift truck 1 alarms exactly when load weight moment M exceeds its predetermined value.

II. The pressure sensors 21, 22 are arranged at the conduits 26, 27 to sense pressures in the rod side and bottom side chambers 7*a*, 7*b* of the tilt cylinder 7, respectively. It is apparent that installation of the sensors 21, 22 into the conduits is easier than the installation into the tilt cylinder 7. However, it should be considered that the sensors 21, 22 may detect pressure losses due to their positions. For this reason, the correction means to correct pressure loss in the conduits 26, 27 is provided, thereby, achieving the easy installation of the sensors 21, 22 without any influence of the pressure loss.

Figure 5:
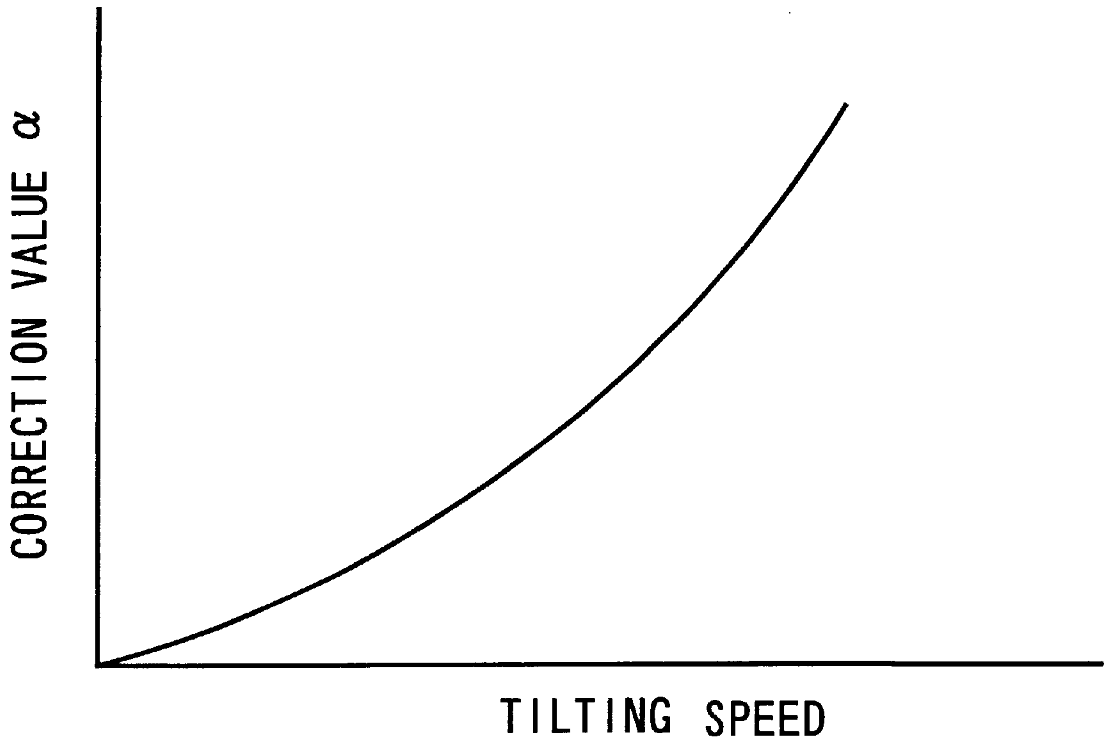
FIG. 5 is a graph illustrating correction values of the pressure loss according to the present invention.

III. As the correction to the pressures detected by the sensors 21, 22 is treated by using the function as shown in FIG. 5 which is predetermined for operation of the tilt cylinder 7, the correction for the pressure loss is done simply.

IV. At the stroke end where the sensors 21, 22 cannot detect the pressures in the chambers 7*a*, 7*b* of the tilt cylinder 7, the value equivalent to the load weight moment is used. The equivalent value, which can be found based on load weight and height of the fork 6 detected by the sensor 24 and potentiometer 25, is useful for finding whether the forklift truck 1 is stable or not, without using hydraulic fluid pressure in the tilt cylinder 7. Therefore, the condition of the forklift truck 1, stable or unstable, can be continuously judged during operation of the tilt cylinder 7.

The present invention is not limited to the embodiment described above, and modifications are applicable as follows.

(1) From the flow chart shown in FIG. 4, step S1 and steps S11 and S12 after step S1 can be omitted in use for a forklift truck whose mast inclination is maximized and minimized before reaching stroke ends of the tilt cylinder. Because the tilt cylinder does not reach its stroke ends, thrust and load weight moment can be calculated based on pressures in the tilt cylinder in whole operation range of the tilt cylinder.

(2) In the flow chart of FIG. 4, it is not limited to that the thrust F is calculated from the pressure $P_1$ of the rod side and the pressure $P_2$ of the bottom side, both of the tilt cylinder 7 as step S2 and step S3, but it is applicable that the load weight moment is measured from the pressure acting to the tilt cylinder 7, and in case that the pressure is measured even at the stroke end, the load weight moment is measured during whole strokes of the tilt cylinder 7, by adopting the step S1 and thereafter step S11, S12. Therefore, this is very effective.

(3) If distance L between a longitudinal axis of the tilt cylinder 7 and a rotation axis of the wheel 9 is substantially constant during tilting motion from maximum tilt angle to minimum tilt angle of the mast 3, the axial force or thrust F can be used for determination of the forklift truck stability without calculating load weight moment M. Therefore, calculation of load weight moment can be omitted in this case.

(4) In FIG. 5, correction value α is the function related to elements such as tilting speed and tilting direction. In addition to the elements, temperature of the hydraulic fluid can be employed as an element to determine the value α.

(5) A first threshold and a second threshold of the load weight moment M may be preset in the controller 31. In this case, the controller alarms when measured moment reaches the first threshold. Thereafter, if the moment reaches the second threshold, the controller controls a changeover valve or a valve disposed between the changeover valve and the tilt cylinder 7 to restrict hydraulic fluid flowing to or from the tilt cylinder 7, and stops tilting motion of the mast 3.

(6) The pressure sensors 21 and 22 can be arranged at inlet/outlet ports of the tilt cylinder 7. In this case, correction of the pressure losses is not necessary.

(7) A sensor sensing tilt angles and stroke ends of the tilt cylinder 7 is not limited to the rotational potentiometer 23. For instance, a linear potentiometer sensing projection of the piston rod 14 may be employed. Likewise, a height sensor sensing fork height is not limited to the rotational potentiometer 25 mounted on the inner mast. The height sensor may be a linear potentiometer mounted on the outer mast to sense movement of the inner mast relative to the outer mast. Or, an ultrasonic sensor may be employed as a fork height sensor, the ultrasonic sensor being mounted within the lift cylinder to sense a position of the piston rod of the cylinder.

(8) A loading attachment is not limited to the fork. A roll cramp for conveying roll papers, a block clamp for conveying or piling up blocks, and a ram for conveying a coil or cylindrical load, such as coil wire or cable, may be employed as a loading attachment of the truck.

The present examples and embodiments discussed above are to be considered as illustrative and not restrictive and the invention is not to be limited to the details given herein but may be modified.

What is claimed is:

1. A forklift truck comprising:

a loading attachment;

a mast supporting said loading attachment, said mast guiding movement of said loading attachment to be raised and lowered;

a tilt cylinder operated by hydraulic fluid from a hydraulic fluid source, said tilt cylinder having a piston and a piston rod within said cylinder, the piston rod being connected to the piston at its one end and connected to said mast at the other end, the piston dividing the inside of said tilt cylinder into a rod side chamber and a bottom side chamber;

a first pressure sensor for detecting pressure of the hydraulic fluid in the rod side chamber of said tilt cylinder;

a second pressure sensor for detecting pressure of the hydraulic fluid in the bottom side chamber of said tilt cylinder; and a controller for calculating axial force of said tilt cylinder based on detected signals from said first and second sensors, wherein said controller further calculates load weight moment in a back and forth direction of the forklift truck based on the axial force, and said controller compares the calculated load weight moment with a predetermined value.

2. A forklift truck according to claim 1, wherein said controller outputs a warning signal based on the comparison.

3. A forklift truck according to claim 1, the forklift truck further comprising a first conduit connected to the rod side chamber of said tilt cylinder, wherein said first sensor is arranged in said first conduit.

4. A forklift truck according to claim 3, the forklift truck further comprising a second conduit connected to the bottom side chamber of said tilt cylinder, wherein said second sensor is arranged in said second conduit.

5. A forklift truck according to claim 4, wherein said controller corrects said detected signals.

6. A forklift truck according to claim 5, wherein a correction value used for correcting said detected signals is determined by using a predetermined function of operation of said tilt cylinder.

7. A forklift truck according to claim 1 further comprising:

a stroke end sensor for detecting a stroke end of said tilt cylinder;

a load weight sensor for detecting load weight of said loading attachment; and a height sensor for detecting a lifting height of said loading attachment;

wherein said controller judges whether the forklift truck is in stable condition based on the detected load weight and height of the loading attachment when said stroke end sensor detects the stroke end of said tilt cylinder.

8. A forklift truck according to claim 7, wherein said stroke end sensor is a potentiometer that further detects a tilting angle of said mast.

9. A forklift truck according to claim 8, wherein the potentiometer outputs an electrical voltage as a signal with respect to the tilting angle, and wherein the tilting angle of said mast is determined based on the voltage level.

10. A method for measuring a load weight moment in a forklift truck equipped with a tiltable mast supporting a loading attachment and guiding the loading attachment and a tilt cylinder connected to the mast, the method comprising the steps of:

detecting pressure in each of a rod side chamber and a bottom side chamber of the tilt cylinder;

calculating axial force of the tilt cylinder based on the detected pressures in the rod side and bottom side chambers;

calculating a load weight moment in a back-and-forth direction of the forklift truck based on calculated axial force; and judging whether the forklift truck is stable based on comparison of the calculated moment with a predetermined moment.

11. A method according to claim 10 further comprising the step of:

correcting the detected pressure by using a predetermined correction value after the pressures are detected.

12. A method according to claim 10 further comprising the step of:

outputting an alarm sign at the time of the judgment that the forklift truck is unstable.

13. A method according to claim 10 further comprising the steps of:

detecting whether the tilt cylinder reaches its stroke end;

detecting load weight and lifting height of the loading attachment; and judging whether the forklift truck is in stable condition based on the detected load weight and lifting height of the loading attachment when the stroke end of the tilt cylinder is detected.

* * * * *